Jan. 24, 1961 V. P. SIMMONS 2,969,057
NEMATODIC SWAB
Filed Nov. 4, 1957 2 Sheets-Sheet 2

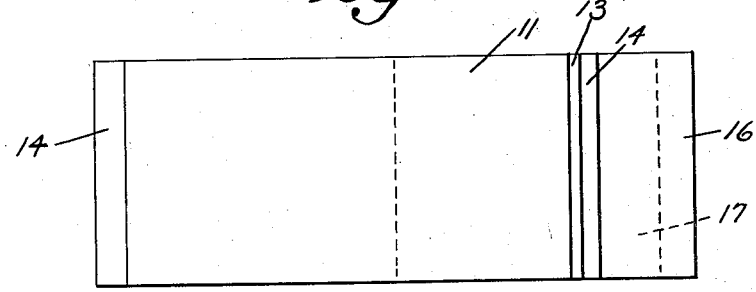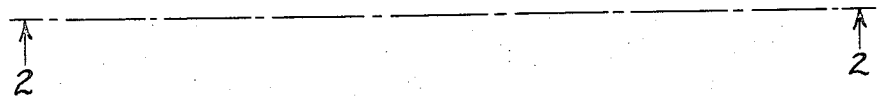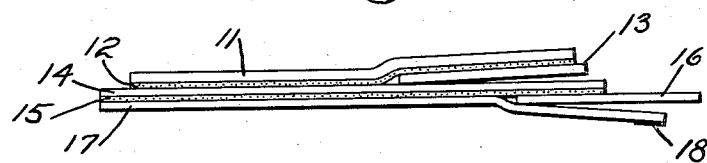

INVENTOR
VAUGHAN P. SIMMONS
BY Charles, Fox, Seidel
Bateman & Hoar
ATTORNEYS

United States Patent Office 2,969,057
Patented Jan. 24, 1961

2,969,057

NEMATODIC SWAB

Vaughan P. Simmons, Wauwatosa, Wis., assignor to W. H. Brady Co., Milwaukee, Wis., a corporation of Wisconsin Filed Nov. 4, 1957, Ser. No. 694,450

1 Claim. (Cl. 128—2)

This invention relates to nematodic swabs, that is to say swabs primarily designed for collecting and preserving specimens for examination under the microscope to diagnose pin-worm infestation, but also for other similar diagnostic purposes; and more particularly resides in such a swab, comprising three layers of short-length tape, each tape consisting of pliant sheet material, and each having different physical characteristics from the others, as follows: an upper layer of preferably opaque tape, its upper surface being preferably capable of being written-on, its under surface being coated with a permanently tacky, pressure-sensitive eucohesive adhesive; an intermediate layer of transparent film, its under surface being coated with a permanently tacky pressure-sensitive eucohesive adhesive; and a lower layer, preferably release-coated on its upper surface, its lower surface being not coated with tacky material; exposed ends of the three tapes being non-tacky, to serve as tabs for manual manipulation.

The need for the present invention will be understood when one considers the habits of the pin-worm. The female worms crawl out of the anus of the victim at night, lay their eggs around the anal region, and then disintegrate. The eggs are microscopically small. The medical treatment of such an infestation usually covers a period of seven days.

Accordingly, in order to keep track of the progress of the treatment, it is desirable to make a daily check for the presence of pin-worm eggs, during the seven-day period, with a check for re-infection on about the fourteenth day. Due to the nocturnal habits of the female worm the samples for examination under the microscope should be collected early each morning, before the victim has had a chance to defecate or take a bath. Therefore the samples are often taken, in the home, by a member of the family, usually a parent of the victim, as the victim is often a child.

Heretofore there has been no practical means for a parent to collect the sample and either transfer it to a microscope slide, or get it to the doctor without so transferring it. The best prior expedient has been to wrap a piece of ordinary cellophane library-tape, tacky side out, around the parent's index finger, rub the thus swathed finger on the perianal region, and then try to get the tape off the finger and onto a microscope slide, without getting the tape all tangled up and/or losing much of the specimen. Even the doctors had difficulty with this makeshift expedient. And it provided no convenient self-contained means for marking the sample for identification.

Accordingly the principal object of the present invention is to provide a simple swab for collecting diagnostic material from the perianal region of a patient, for transferring this material to a microscope slide, for preserving the material thus collected and transferred, and for marking it for identification.

The invention can also be used for other diagnostic purposes, such as collecting other sorts of dry samples (as in skin ailments), and even in certain types of wet work; and can be used to advantage by doctors and nurses, as well as by laymen.

Other objects and advantages of the invention will appear in the description which follows.

In the description, reference is made to the accompanying drawings, forming a part hereof, in which there is shown, by way of illustration and not of limitation, a certain specific form in which the article of manufacture of the present invention may be embodied.

In the drawings, all the figures are to the same scale, and are enlarged from an actual physical specimen of the invention, so that length and breadth will be about 50% increased in the printed patent. The thicknesses are disproportionally enlarged still more, for the purpose of clearly illustrating the various laminae.

Fig. 1 is a plan view of the swab of the present invention, as it comes, ready for use.

Fig. 2 is an edge view of the swab, as seen from the line 2—2 of Fig. 1.

Fig. 3 is an edge view of the swab during the removal of the lower layer from the other two layers.

Throughout the description, the same reference numeral is applied to the same member or similar members.

Figure 4:
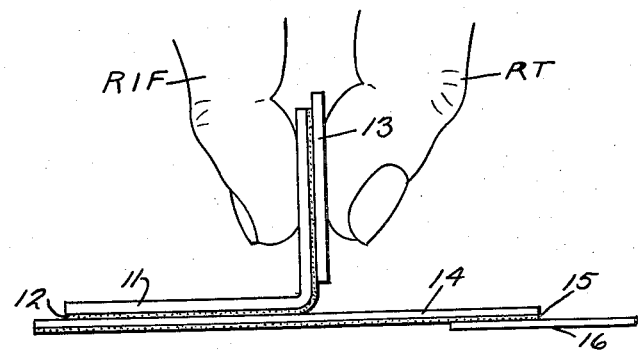
Fig. 4 is an edge view of what is left after such removal, grasped for perianal swabbing.

Referring now to the drawings, and more particularly to Figs. 1 and 2, it will be seen that 11 represents the upper layer of tape, and 12 represents the adhesive on the underside thereof.

Preferably this tape is opaque, and white or other light color so that its upper surface may be written upon with pin or pencil. The thickness might be about 3 to 15 mils, preferably 7 to 11 mils. The preferable material is cloth, or it might be vinyl, or any other pliant sheet material, provided it be capable of performing its major function, namely to protect and keep clear of fingermarks and otherwise clean the upper surface of the intermediate layer (hereinafter discussed), and to furnish a means for manipulation of the intermediate layer during swabbing and certain other steps as will appear hereinafter.

The adhesive 12 could be any convenient permanently tacky eucohesive adhesive substance, preferably some rubber-base adhesive of that sort.

Ordinary surgeon's tape could well serve as elements 11 and 12.

The right-hand end of upper layer 11 of tape is rendered non-tacky, and hence easier to manipulate, by masking the adhesive 12 with a piece of stiff fiber-board 13. This masking could be accomplished by any other material, such as cardboard, paper, or cellophane; or by not coating with adhesive the extreme end of tape 11; or even by extending the adhesive-coated tape further to the right, and then doubling it back under itself. But the adding of something stiff, such as fiber-board, about 10 to 15 mils thick, is preferred, as furnishing a firm handle for the steps of swabbing and of mounting the swab on a microscope slide.

The intermediate layer of the swab consists of tape 14 and the adhesive 15 thereon.

Tape 14 must be transparent: i.e., clear or at least reasonably clear, so as not to obscure the specimen which will lie between this tape and the slide, in the microscope. Preferably this tape should be of cellulose acetate, but any other transparent pliant sheet material would do. Two mils is the preferred thickness, with about 1 mil of adhesive 15.

Any clear, or reasonably clear, permanently tacky eucohesive adhesive substance will be satisfactory, but adhesive of the polyisobutylene type is preferred.

The right-hand end of intermediate layer of tape 14 is rendered non-tacky, and hence easier to manipulate, and particularly to prevent its becoming struck to the next layer below, by lapping on a piece of non-tacky material 16, preferably 1 or 2 mils thick. Preferably this tacked-on piece should be some material readily colorable, or should come colored, so as to distinguish it from the rest of the swab. It does not have to be transparent. Colored cellophane is preferred, but any other sheet material, such as paper, or uncoated cellulose acetate, will do, provided it possesses the above characteristics. It need not be stiff. The masking could be accomplished even by not coating with adhesive the extreme end of tape 14; or even by extending the adhesive-coated tape to the right, and then doubling it back under itself.

The non-tacky tabs on the ends of tapes 11 and 14 could even be combined, either with or without fiber-board 13 (or its equivalent stiffener), as for example by omitting lapped-on piece 16, and extending adhesive-coated tape 11 to the right, and then doubling it back under the adhesive-coated end of tape 14. But this would alter somewhat the steps to be taken by the user of the swab, as will be explained hereinafter.

The lower layer of the swab consists merely of tape 17.

This tape 17 is merely a liner, to protect the adhesive 15 of the intermediate layer, until use. It need not be either transparent or opaque. Two mils is the preferred thickness, and polyethylene terephthalate (known to the trade by the trade-name "Mylar" when produced by E. I. duPont de Nemours Company) is the preferred material, but any readily-releasable sheet material, preferably pliable, would be acceptable. The upper surface of tape 17 may be readily-releasable per se, or be release-coated, or both. One reason for preferring "Mylar" for this lower layer is that it is readily-releasable without a release-coating, thus preserving a higher degree of tack in the adjoining adhesive 15 of intermediate layer 14, at the times of use thereof. But the use of a release-coating even with "Mylar" is not precluded. Tape 17 should also preferably be of a material which can readily be printed on, so that it may carry directions for use, patent marking, trade-mark, maker's name and address, etc.

The right-hand end of tape 17 is inherently available to constitute a non-tacky tab, for purposes of manipulation. Preferably printed on the extreme end thereof, is a marker 18 of distinctive color, to distinguish this tab.

From the foregoing description it will be seen that fiber-board 13, and the right-hand end of upper layer tape 11 and of its adhesive 12, together constitute a tack-free manipulative tab for the upper layer. Lapped-on piece 16, and the right-hand end of intermediate layer tape 14 and of its adhesive 15, together constitute a tack-free manipulative tab for the intermediate layer. And the right-hand end of lower-layer tape 17 constitutes a tack-free manipulative tab for the lower layer.

These three tabs should preferably be independent, and all located at the same end of the swab, for ready manipulation. Also preferably, to assist in manipulation, each of the two lower tabs should project beyond the tab above it. And preferably, each of the two upper tabs should project inwardly beyond the inward end of the tab below it, so as to protect the tab below from becoming smeared with adhesive.

A method of using the swab is as follows. See Figs. 3, 4, 5, and 6, in which: RIF indicates right index finger, RT indicates right thumb, LIF indicates left index finger, and LT indicates left thumb. These thumbs and fingers are seen as viewed by person who is doing the manipulating.

The swab comes in the condition shown in Figs. 1 and 2, preferably packaged. The parent, or other person who is to obtain the sample, takes the lower tab between the left thumb and index finger, and the intermediate tab between the right thumb and index finger, as shown in Fig. 3, and peels off lower layer 17, and throws it away. Alternatively, the upper tab might well be seized, along with the intermediate tab, by the right thumb and index finger.

If, as suggested alternatively earlier herein, the upper and intermediate tabs were made integral, by turning an extended portion of tape 11 under the adhesive-coated end of tape 14, the resulting single tab would be seized by the right thumb and index finger. But, in this event, the extended portion of tape 11 would then have to be peeled free of tape 14, and reapplied under the end of tape 11 to form the upper manipulative tab, before the next step is taken.

In any event, the upper manipulative tab is then taken between the parent's right thumb and index finger, as shown in Fig. 4, and the exposed tacky surface 15 of transparent tape 14 is thereby patted on the patient's perianal region, or other surface area from which a sample is desired for microscopic examination. The fingers of the parent's other hand can be used to spread the patient's buttocks.

Figure 5:
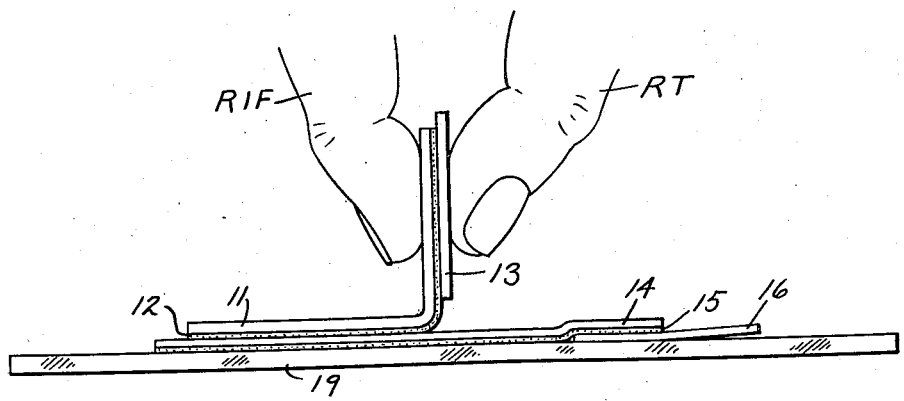
Fig. 5 is an edge view of the swab, as it is being mounted on the microscope slide there shown.

Immediately, as shown in Fig. 5, the swab is applied to the microscope slide 19, which should be furnished, packaged with the swab, the fingers of the left hand being used to smooth down the swab on the slide, preferably after the upper tab has been permitted to drop back into place. Slide 19 could be a conventional glass slide, of approximately the dimensions of 3" by 1" by 0.04"; or preferably a transparent slide of some non-fragile material having about the same dimensions.

Such identifying data as the doctor may desire (for example: name of patient, and date and time of taking the sample) can be written on the top surface of upper layer tape 11.

The whole can then be wrapped up and given to the doctor.

Figure 6:
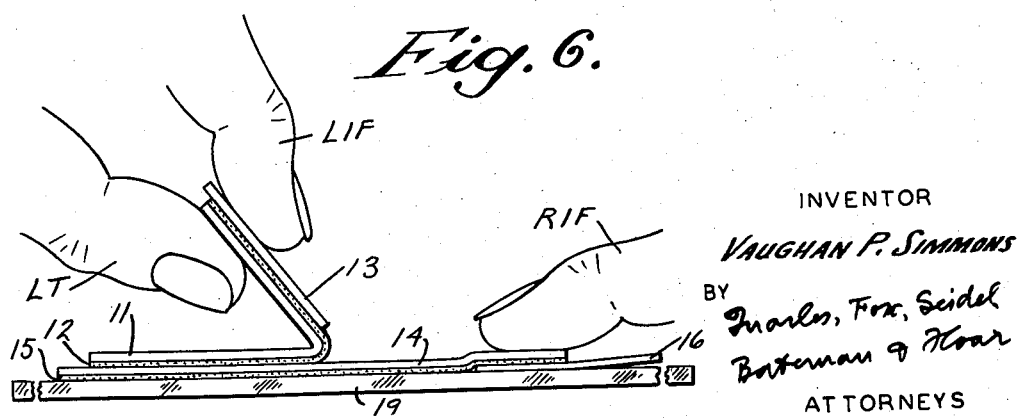
Fig. 6 is an edge view of the swab, thus mounted, as the doctor removes the upper layer, preliminary to diagnostic microscope examination.

When the time comes for microscopic examination of the specimen, the doctor can peel off the upper layer tape 11, as shown in Fig. 6, with the thumb and forefinger of one hand, holding down tape 14 with a finger of the other hand.

To remove waste material which is frequently present in the specimen, sodium hydroxide can be used. For this purpose the tape is stripped almost completely off the slide, by taking hold of tab 16. The sodium hydroxide is then applied to the upper surface of the slide, and the specimen-bearing tape 14 is then smoothed back onto the slide. This gets rid of the waste material without affecting the pin-worm eggs.

From the foregoing description of the construction and use of the present invention, it will be readily evident that the present invention affords a novel and useful swab for collecting and preserving specimens for examination under the microscope, which swab can be readily used by any intelligent layman.

Now that one embodiment of the invention has been shown and described, and several departures therefrom have been suggested, it is to be understood that the invention is not to be limited to the special forms or arrangements of parts herein shown and described, nor to the primary diagnostic use for which it was designed.

The steps of the procedures for using the swab are not to be imported into the claim.

The chemical or physical constitution of any of the elements is not to be imported into the claim, except insofar as expressly recited in the claim.

What is claimed is:

A swab for collecting and preserving specimens for microscopic examination, comprising: an upper layer of pliant sheet material capable of being readily written upon, namely cloth tape; an intermediate layer of transparent pliant sheet material, namely cellulose acetate; a lower layer of pliant sheet material, namely polyethylene terephthalate; a coating of permanently tacky eucohesive adhesive on the underside of the upper layer; a coating of substantially clear permanently tacky eucohesive adhesive on the underside of the intermediate layer; and three independent tack-free tabs for manipulation all on the same end of the swab, each tab being on the end of one of the three layers; the upper tab comprising one end of the adhesive-coated upper layer and a piece of stiff material covering the adhesive coating of said end.

References Cited in the file of this patent

UNITED STATES PATENTS

| | | |
|---|---|---|
| 1,949,271 | Duhamel | Feb. 27, 1934 |
| 1,972,448 | Jenkins | Sept. 4, 1934 |
| 2,133,609 | Eustis | Oct. 18, 1938 |
| 2,139,377 | Mull et al. | Dec. 6, 1938 |
| 2,170,147 | Lane | Aug. 22, 1939 |
| 2,235,436 | Laub | Mar. 18, 1941 |
| 2,400,406 | Godoy | May 14, 1946 |
| 2,650,213 | Hofrichter | Aug. 25, 1953 |
| 2,783,172 | Avery | Feb. 26, 1957 |

OTHER REFERENCES

Cecil: Text Book On Medicine, 7th Edition, ©. 1947, p. 485. (Copy in Div. 43.)